United States Patent
Wu et al.

(10) Patent No.: US 7,113,203 B1
(45) Date of Patent: Sep. 26, 2006

(54) METHOD AND SYSTEM FOR SINGLE-CHIP CAMERA

(75) Inventors: Ben S. Wu, Saratoga, CA (US); James Cape, Belmont, CA (US); Shang-Hung Lin, San Jose, CA (US)

(73) Assignee: Magna Chip Semiconductor, Ltd., (KR)

( * ) Notice: Subject to any disclaimer, the term of this patent is extended or adjusted under 35 U.S.C. 154(b) by 6 days.

(21) Appl. No.: 10/141,450

(22) Filed: May 7, 2002

(51) Int. Cl.
*H04N 5/225* (2006.01)
*H04N 17/02* (2006.01)

(52) U.S. Cl. .............................. 348/207.99; 348/222.1; 348/180

(58) Field of Classification Search .................. 710/72, 710/73, 74; 348/207.99, 187, 189, 180, 181, 348/241, 222.1, 376
See application file for complete search history.

(56) References Cited

U.S. PATENT DOCUMENTS

2002/0039139 A1* 4/2002 Hsu et al. ................... 348/222
2002/0050518 A1* 5/2002 Roustaei ..................... 235/454
2002/0176009 A1* 11/2002 Johnson et al. ............. 348/229

\* cited by examiner

*Primary Examiner*—Aung Moe
(74) *Attorney, Agent, or Firm*—Fernandez & Associates, LLP

(57) ABSTRACT

Method and system for a single-chip camera where an image sensor is a single-chip digital color imaging device that incorporates a sensor array that captures still or full-motion video and converts the images to digital data. Moreover, the image sensor employs a built-in correlated double sampler, an internal analog-to-digital converter, and a timing circuitry. Output from the sensor is an 8-bit or more raw data, horizontal sync signals, and vertical sync signals. The output raw data may then be fed into a compression circuit that generates packets of compressed output data. The compressed data is transmitted with a USB transceiver using isochronous packets. The packets are then received, decompressed, and color processed by a host PC.

38 Claims, 6 Drawing Sheets

METHOD AND SYSTEM FOR SINGLE-CHIP CAMERA

BACKGROUND INFORMATION

1. Field of Invention

The present invention relates to the field of color imaging devices, and particularly to single-chip image and video camera.

2. Description of Related Art

Traditional cameras use film to store images. Analogously, a digital camera uses a solid state device called an image sensor to store images.

Image sensors are built on silicon chips containing millions of photosensitive diodes named photocells. Each photocell records the intensity of brightness of light shone on the photocell.

Moreover, each photocell reacts to light by accumulating a charge that directly corresponds to the brightness of the light. The brightness recorded is then converted to a set of numbers that can be used to digitally save the image and set the color and brightness of pixels on the screen or ink on printed page to reconstruct the image.

A Charge-Coupled Delay (CCD) sensor uses a non-standard semiconductor process to manufacture the photocell. Image-processing for a CCD sensor is normally done in a separate chip set.

A conventional design for the CCD digital camera includes an image sensor, an analog-to-digital converter (ADC) chip to convert sensory signal into digital form, a companion chip to handle image-processing and data/control input and output, and external memory interface for data storage element. Such designs requires tremendous amount of collaborative effort to establish communications between different chips, and therefore is non-optimal in terms of form factor and power consumption.

Due to a recent rapid growth of demand for the digital camera consumer market, an abundant supply of image sensors at a low per unit cost has become critical. Furthermore, it is crucial for image sensors to consume low power and be small in size in order to effectively construct digital cameras that are compact with a long battery life.

Accordingly, there is a need to produce cost effective image sensors that are small in size and consume low power.

SUMMARY OF THE INVENTION

The present invention provides the method and system for a single-chip integrated circuit (IC) camera. One embodiment of the invention comprises six functional elements:

1. External lens to focus image light onto sensor surface.

2. An image sensor comprising a sensor array, a built-in correlated double sampler (CDS), an internal analog-to-digital converter (ADC), and a timing circuitry.

The output of the sensor may be one of several bit depth formats, such as an 8-bit, 10-bit, or 12-bit depth format. Moreover, the output data may include color information or timing signals such as vertical and horizontal sync signals.

3. An image-processing element. The image-processing element receives raw image data and timing signals from the sensor, and performs some or all of the following operations:
   a. Image/video rendering and enhancement such as demosaicking, color correction, gamma correction, sharpening, de-noising, histogram modification, chroma suppression, anti-flickering, auto exposure control, auto gain control, auto white balancing, illumination estimation, auto focus, etc.
   b. Image/video recognition such as skin tone detection, moving object segmentation/detection/recognition, human face detection/recognition, gesture recognition, fingerprint/iris identification/verification, vehicle recognition, license plate recognition, etc.
   c. Image/video compression such as joint photographic experts group (JPEG), moving picture experts group (MPEG), JPEG2000, etc.

Furthermore, the image-processing functions may be implemented in specific hardware accelerated circuits and/or with embedded microprocessor firmware.

4. A data storage element. The data storage element serves as required as the intermediate data buffer and/or finished image data storage after image-processing. Examples of available storage types are static random access memory (SRAM), dynamic random access memory (DRAM), Flash, etc.

5. A communication interface element. The communication interface element controls the data and control traffic in and out of the camera. Examples of available interfaces that can be included in the element are:
   a. Transmission/Control interface:
      i. Interfaces to wired communication channels such as universal serial bus (USB), IEEE 1394, local area network (LAN), and/or
      ii. wireless channels such as Bluetooth, Home radio frequency (RF), Wireless LAN, can be used to transmit image/video stream and/or to control the IC.
   b. Memory interface:
      i. Interfaces to external Compact Flash, Memory Stick, or other non-volatile memory to store images, and/or
      ii. SRAM or DRAM in order to store the captured image/video temporarily.
   c. Display interface:
      i. Interfaces to liquid crystal display (LCD), light emitting diode (LED) so that image/video data can be displayed for preview, and/or
      ii. National television standard committee (NTSC), phase alternating line (PAL), high definition television (HDTV) so that image/video data can be broadcast.
   d. Audio interface:
      i. Interface to receive data from an external microphone and/or
      ii. drive external speakers.

6. A test access element. The test access element provides access to the internal data for device functionality verification during product manufacturing. Examples of the data that can be driven and/or received are:
   a. Received data for testing:
      i. Data out from sensor.
      ii. Data out from compression engine.
   b. Driven data for testing
      i. Data in to compression engine.
      ii. Data in to communications interface.

In one embodiment of the present invention, an image sensor is a single-chip digital color imaging device that incorporates a sensor array that captures still or full-motion color video and converts the images to digital data, the image-processing element compresses the raw image data, the data storage element stores lines of data for compression, and the communication interface element handles USB traffic.

Output from the sensor in this embodiment are in the form of 8-bit raw data ranging from 0 to 255, horizontal sync signals, and vertical sync signals, with color information encoded in an alternating RGGB (Bayer) type pattern.

The output raw data in this embodiment is then fed into a compression element that generates an 8-bit compressed data ranging from 0 to 255. The 8-bit compressed data are gathered into packets and then transmitted with a USB transceiver in the communications interface element using isochronous packets. The packets are then received, decompressed, and color processed by a host PC. Furthermore, dead pixel and dead columns in the sensor array are removed during this processing in order to generate a high quality image.

The present invention provides single-chip cameras that are small in size, cost effective and require low power consumption, the cameras are thereby ideal for applications where space and low power consumption are critical.

Therefore, the present invention is proposed to compact as many functional elements as possible into a single IC so that the product size is smaller, the interface is simpler, the power consumption is lower, and the cost is lower.

BRIEF DESCRIPTION OF THE DRAWINGS

The accompanying drawings that are incorporated in and form a part of this specification illustrate embodiments of the invention and together with the description, serve to explain the principles of the invention.

DETAILED DESCRIPTION

The following description is presented to enable one of ordinary skill in the art to make and use the invention and is provided in the context of a patent application and its requirements. In the following description, specific nomenclature is set forth to provide a thorough understanding of the present invention. It will be apparent to one skilled in the art that the specific details may not be necessary to practice the present invention. Furthermore, various modifications to the embodiments will be readily apparent to those skilled in the art and the generic principles herein may be applied to other embodiments. Thus, the present invention is not intended to be limited to the embodiments shown but is to be accorded the widest scope consistent with the principles and features described herein.

Figure 1:
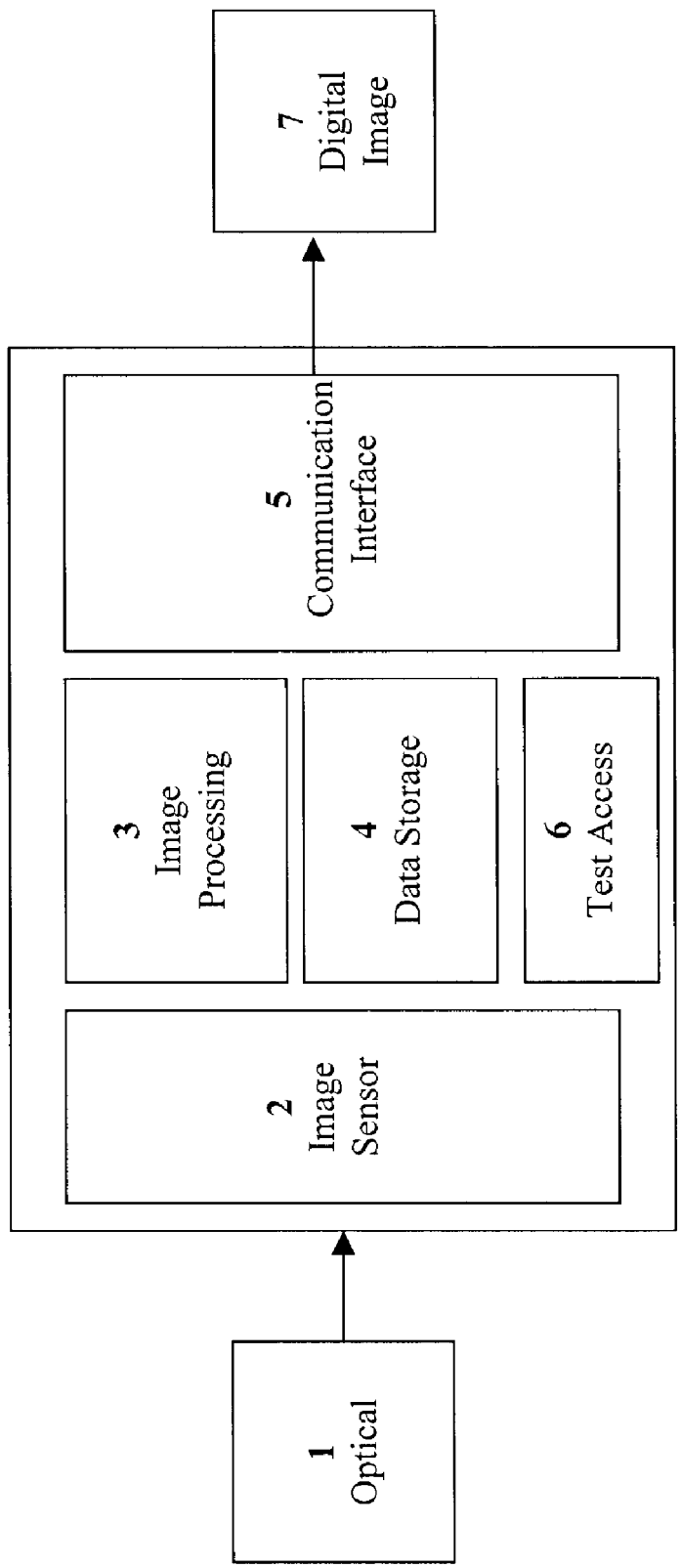
FIG. 1 is a block diagram illustrating a system comprising a single-chip camera in accordance to one embodiment of the present invention.

Architecture:

FIG. 1 is a block diagram illustrating a system 100 comprising a single-chip camera in accordance to one embodiment of the present invention. System 100 comprises: an external optical element denoted 1, an image sensor denoted 2, an image-processing element denoted 3, a data storage element denoted 4, a communication interface denoted 5, a test access element 6, and the resulting digital image denoted 7.

Figure 2:
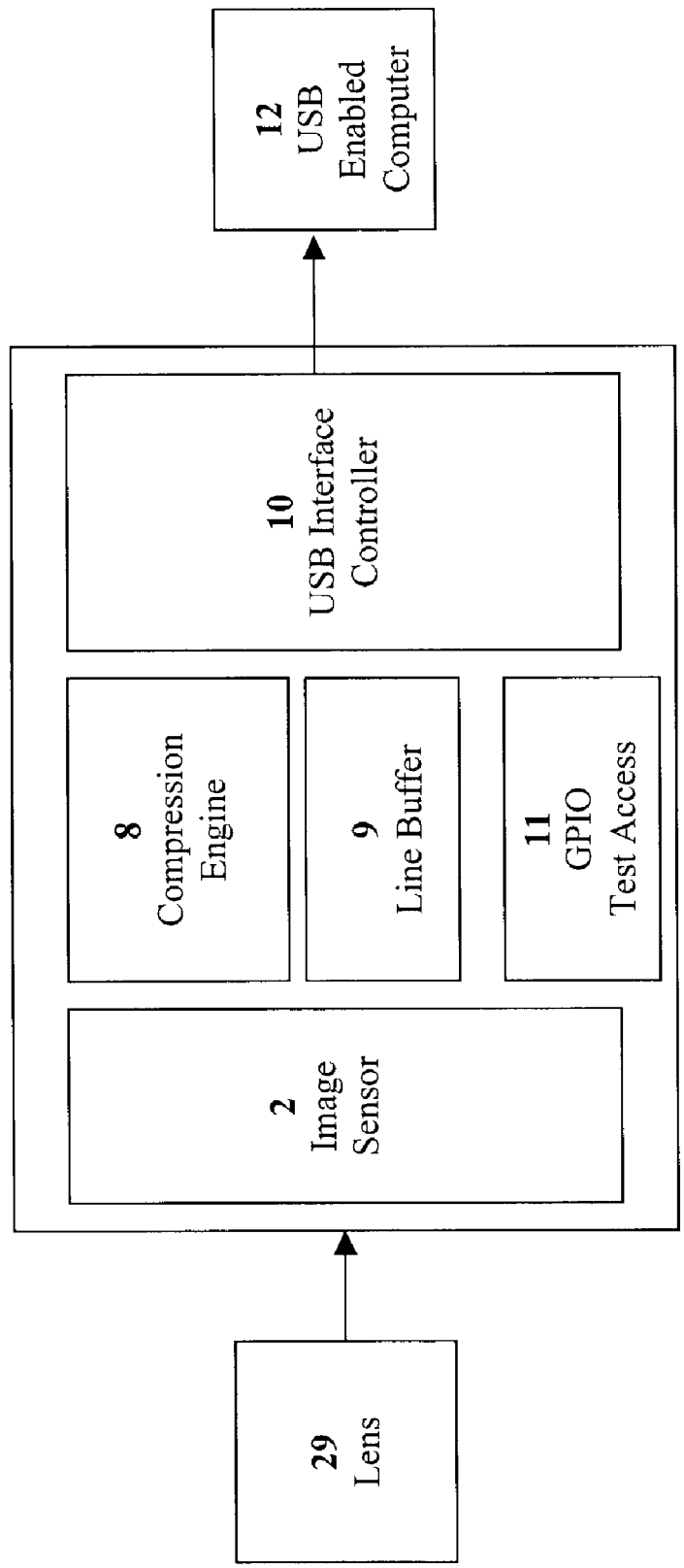
FIG. 2 is a block diagram illustrating a system comprising a single-chip camera in accordance to a second embodiment of the present invention.

FIG. 2 is a block diagram illustrating a system 200 comprising a single-chip camera in accordance to a second embodiment of the present invention. System 200 comprises: an external lens denoted 29, an image sensor denoted 2, a compression engine denoted 8, a line buffer denoted 9, a USB interface denoted 10, a general purpose input/out (GPIO) test access element denoted 11, and a USB enabled computer denoted 12.

System 200 shown in FIG. 2 is a single-chip, common interchange format (CIF) resolution, digital color PC camera. Moreover, image sensor 2 further comprises a 352×288 pixels image array, and provides the capability of a digital camera on a single integrated circuit.

Figure 3:
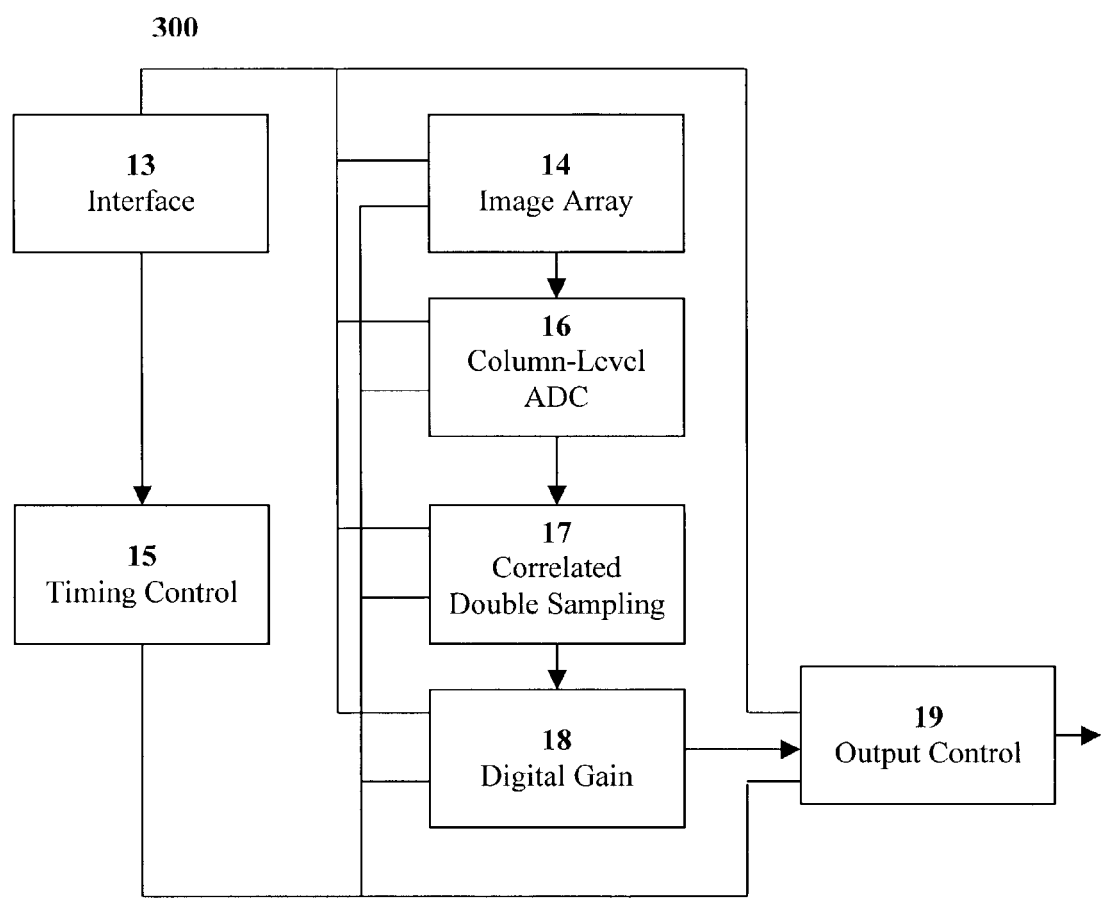
FIG. 3 is a block diagram illustrating interactions between various components of an image sensor in accordance to one embodiment of the present invention.

FIG. 3 is a block diagram 300 that illustrates interactions between various components of image sensor 2 in accordance to one embodiment of the present invention.

Block diagram 300 comprises: an interface denoted 13, a timing control element denoted 15, an image array such as a 352×288 pixels image array denoted 14, a column level analog-to-digital converter (ADC) denoted 16, a correlated double sampling process denoted 17, a digital gain element denoted 18, and an output control element denoted 19.

Each pixel of image array 14 comprises a light sensitive photo diode and a set of control and transfer transistors. At the beginning of each cycle, a row of pixels is pre-charged to the maximum value. Several lines of pixels are then exposed to light and sampled by ADC 16.

Moreover, all programmable parameters are set by writing through interface 13, the 8-bit interface in turn then addresses a register file comprising control registers. Interface 13 may be one of several possible devices such as a USB interface 10 as shown in FIG. 2.

In order to eliminate point-wise fixed pattern noise (FPN), CDS process 17 is performed where a reset value sampled prior to sampling the pixels is subtracted from the values of the sampled pixels. Therefore, the output of CDS is approximately proportional to the amount of received light, which is a value ranging from 0 to 255 for an 8-bit ADC embodiment.

The brightness of a captured image may vary dramatically and render the image either over-exposed or under-exposed. In order to accommodate for different brightness, a user may change the exposure time or digital gain by adjusting one or more registers designated to control exposure time and a digital gain multiplier 18. In order to preserve color fidelity, the digital gain multiplier 18 can be individually programmed for each color.

The resulting data is then sent for compression by output control element 19, along with any necessary timing signals.

Figure 4:
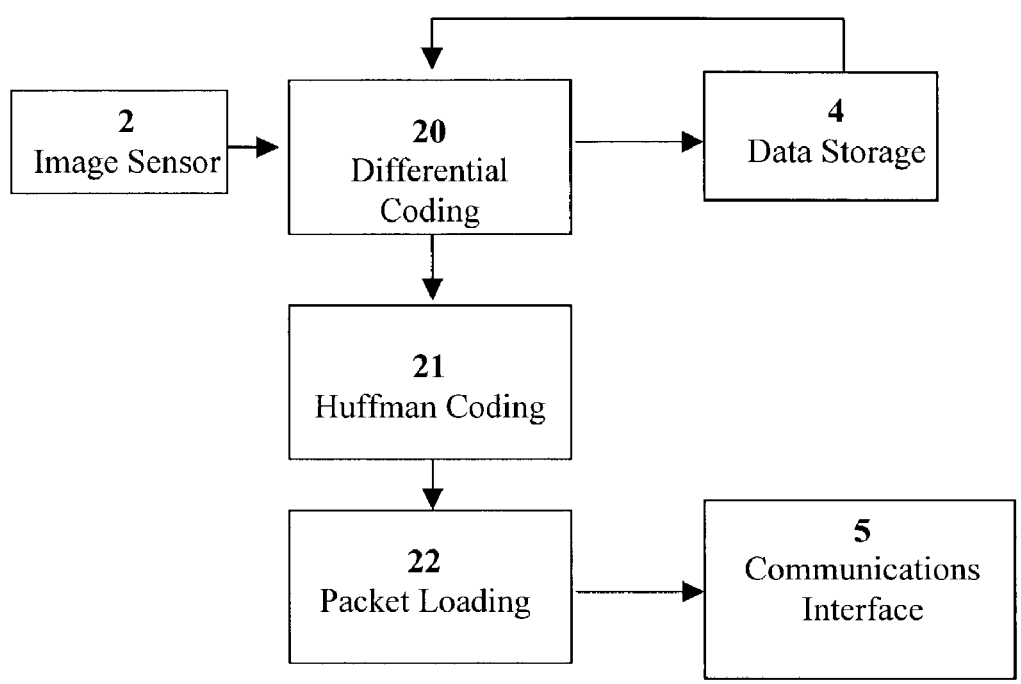
FIG. 4 is a block diagram illustrating interactions between various components of a compression engine in accordance to one embodiment of the present invention.

Compression Algorithm:

FIG. 4 is a block diagram 400 illustrating video data compression in accordance to one embodiment of the present invention.

Block diagram 400 comprises: an image sensor denoted 2, an differential coding element denoted 20, a data storage element denoted 4, a Huffman coding element denoted 21, a packet loading element denoted 22, and a communication interface element denoted 5.

Video data is presented to the compression engine at a rate of 352×288*30=3 M bytes per second, while a typical low cost bus such as USB supports only up to 1 M bytes per second data transfers. Therefore, video data must be compressed within a single-chip camera.

Compression engine 8 receives Bayer pattern image data from image sensor 2, compresses the raw data, and then transfers the data to communication interface 5.

Moreover, the compression method used in compression engine 8 is a combination of a differential coding 20 and Huffman coding 21. The resulting bits are then loaded into packets 22 for transfer to communications interface 5.

Although the compression algorithm is described as a combination of a differential coding and a Huffman coding, other compression schemes may be used such as JPEG, MPEG, or wavelet.

Figure 5:
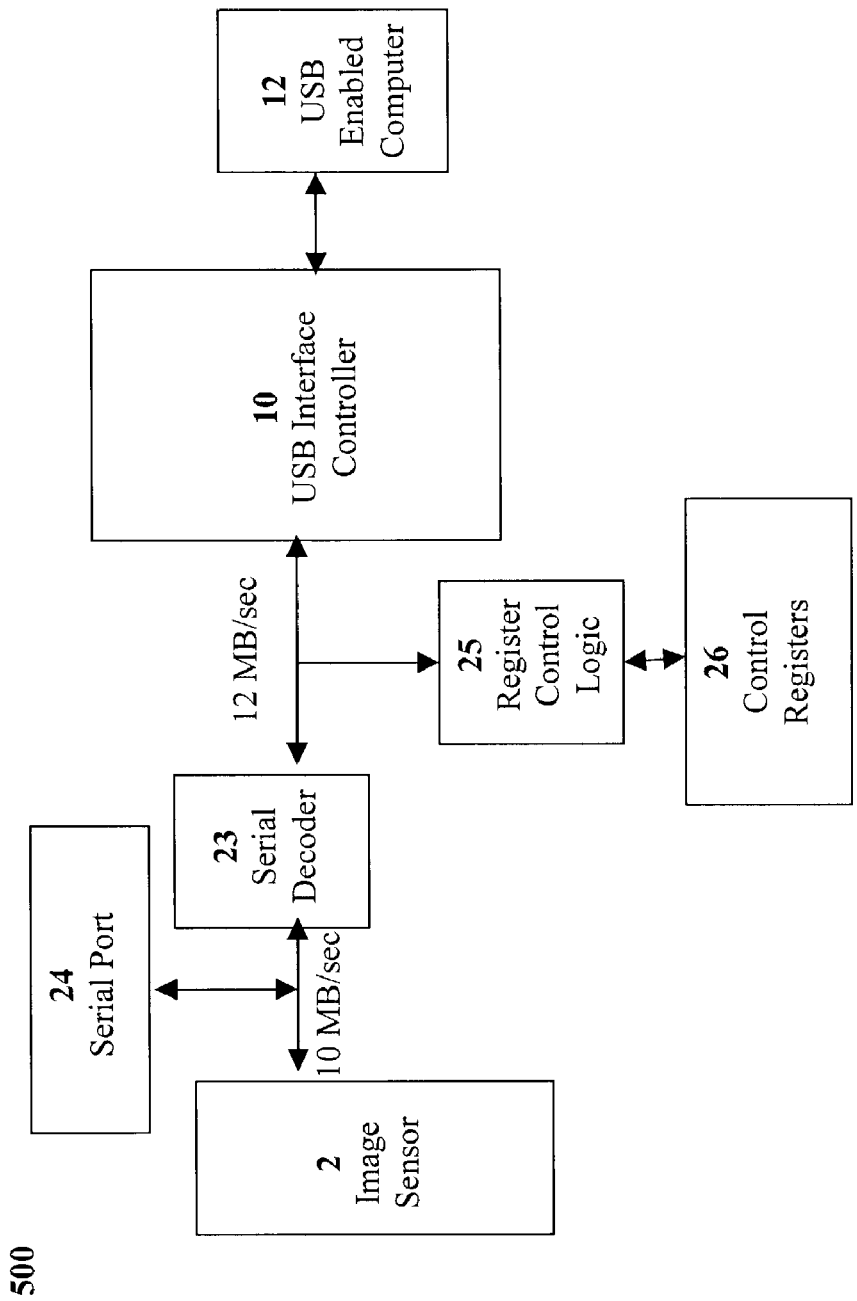
FIG. 5 is a block diagram illustrating interactions between various components within a communications interface element in accordance to one embodiment of the present invention.

Communication Interface:

FIG. 5 is a block diagram 500 illustrating interactions between an image sensor and a communication interface in accordance to one embodiment of the present invention.

Block diagram 500 comprises: an image sensor denoted 2, a serial decoder denoted 23, a serial port denoted 24, a register control logic element denoted 25, a control registers element denoted 26, a USB interface controller 10, and a USB enabled computer denoted 12.

A communication interface transfers data to computer 12 through USB interface controller 10. The communications interface also receives and transmits register control logic 25 and GPIO control signals to and from computer 12.

During normal operation, the output format of the USB controller interface 10 is an 8-bit USB 1.1 compatible compressed video data. The data is transmitted with a USB transceiver using isochronous packets.

The video quality is affected by the size of the packets. Increased video quality can be achieved by transmitting larger packet sizes. Furthermore, the packets are received, decompressed, and color processed by host PC 12.

Although controller 10 is described as a USB port, other communication schemes may be used such as a IEEE 1149, LAN, Bluetooth, etc.

Register Control:

In order to configure and control a single-chip camera in accordance to one embodiment of the present invention, register control logic element 25 in the communications interface translates control data to/from integrated registers 26 in the single-chip camera.

Furthermore, serial decoder 23 translates high-speed requests at 12 MB/sec from controller 10 to low-speed 10 kB/sec control signals for image sensor 2.

Moreover, external GPIO pins can be read/written through register control 25 to provide additional product functionality such as status LEDs, strobe flash control, shutter trigger input, etc.

Figure 6:
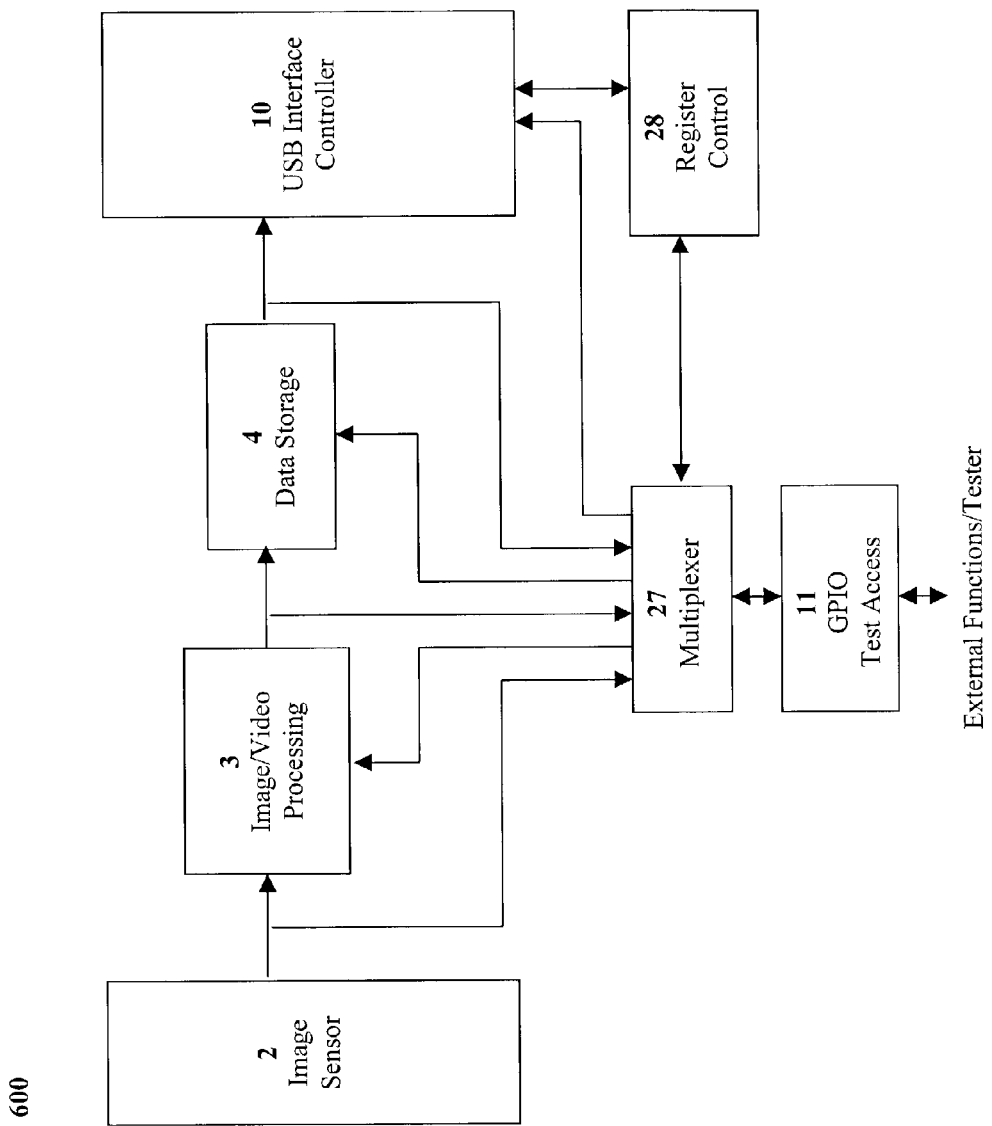
FIG. 6 is a diagram illustrating a test access element in accordance to one embodiment of the present invention.

Test Mode:

FIG. 6 is a block diagram 600 representing a GPIO test access element in accordance to one embodiment of the present invention.

Block diagram 600 comprises: an image sensor denoted 2, an image/video processing element denoted 3, a data storage element denoted 4, a USB interface controller denoted 10, a register set denoted 28, a multiplexer denoted 27, and a GPIO test access element denoted 11.

In one embodiment of the present invention, the single-chip camera comprises general purpose input/output pins (GPIOs) 11. These pins are available for control of external functions.

Furthermore, no other pin on the sensor is directly controllable except for the GPIOs. An on-chip multiplexer or mux 27 controls the GPIOs so that the pins may either be connected to a register set 28 for general purpose usage or to internal data input and output for testing purposes.

Due to the complex nature of the camera, it is difficult to determine the correct functionality of each element. Any particular light input may generate significantly different outputs, depending upon the lens used, shadowing, color Temperature, etc, followed by compression.

In order to verify functionality, the input and output of each element can be driven by or to the GPIO pins through multiplexer 27. The use of GPIO pins allows full testing of each element, independent of the example variables listed above.

In keeping with the nature of the current embodiment, eight GPIOs 11 are supplied with the present invention. The eight pins provide sufficient control and match the data widths between each of the elements in this embodiment, without increasing the device cost by adding significant number of pins.

Moreover, although eight pins are designated as general input/output pins in this embodiment of the present invention, the number of pins may be increased or reduced in order to optimally test a device.

Isolation:

A single-chip camera in accordance to one embodiment of the present invention comprises a plurality of blocks, each block is categorized as being either digital or analog in nature.

Furthermore, in order to ensure good image capture, it is necessary to separate the electrical activity of the analog blocks from the electrical noise generated in the digital blocks. This separation is necessary for an integrated single-chip mixed analog/digital camera, and is accomplished during device layout.

Power Control:

In order to shut off power to a single-chip camera in accordance to one embodiment of the present invention, a designated block on the USB interface monitors changes to the sensor, and the block stops all activities on the sensor when it detects that a low power state is requested.

Furthermore, prior to shut off, the designated block checks that there are no floating input pins and that no output pin is driving opposite to activities on the board. Power control is a feature of an integrated single-chip camera.

Although the invention has been described in connection with several embodiments, it is understood that this invention is not limited to the embodiments disclosed, but is capable of various modifications that would be apparent to a person skilled in the art.

For example, although controller 10 is described as an USB interface controller, other communication channels such as IEE 1394, wired LAN, or wireless LAN may be used in its place.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the arts to best utilize the invention and various embodiments with various modifications as are suited to the particular use contemplated. It is intended that the scope of the invention be defined by the claims appended hereto and their equivalents.

We claim:

1. A single-chip integrated circuit camera system, comprising:
   an image sensor;
   one or more external optical elements for focusing light onto the surface of the image sensor;
   an image-processing element for receiving raw image data and timing signals from the image sensor;
   a data storage element for storing image data produced by the image-processing element;
   a communication interface element for controlling input and output data and control signals for the camera;
   an on-chip multiplexer;
   a register set; and
   a test access element for verifying camera internal functionality, said test access element comprises one or more IO pins, wherein the one or more IO pins is either connected to the register set for controlling external functions or connected to internal data inputs and outputs for testing purpose, wherein the connection of the one or more IO pins is controlled by the on-chip multiplexer,
   wherein said image sensor, said image-processing element, said data storage element, said communication interface, said on-chip multiplexer, said register set and said test access element are on said single chip integrated circuit camera.

2. The camera system of claim 1, wherein the image sensor comprises a sensor array.

3. The camera system of claim 2, wherein the image sensor further comprises a built-in correlated double sampler.

4. The camera system of claim 3, wherein the image sensor further comprises an internal analog-to-digital converter.

5. The camera system of claim 4, wherein the image sensor further comprising a timing circuitry.

6. The method of claim 5, wherein the output data is generated as an 8-bit raw data, a horizontal sync signal, and a vertical sync signal.

7. The method of claim 5, wherein the output data is generated as an 10-bit raw data, a horizontal sync signal, and a vertical sync signal.

8. The method of claim 5, wherein the output data is generated as a 12-bit raw data, a horizontal sync signal, and a vertical sync signal.

9. The camera system of claim 1, wherein the image-processing element comprises an element for image rendering or enhancement.

10. The camera system of claim 1, wherein the image-processing element comprises an element for image recognition.

11. The camera system of claim 1, wherein the image-processing element comprises an element for image compression.

12. The camera system of claim 1, wherein the image-processing element is implemented with specific hardware accelerated circuits.

13. The camera system of claim 1, wherein the image-processing element is implemented with embedded microprocessor firmware.

14. The camera system of claim 1, wherein the data storage element comprises a static random access memory.

15. The camera system of claim 1, wherein the data storage element comprises a dynamic random access memory.

16. The camera system of claim 1, wherein the data storage element comprises a non-volatile memory.

17. The camera system of claim 1, wherein the communication interface element comprises an interface to a control or transmission interface.

18. The camera system of claim 1, wherein the communication interface element comprises an interface to a memory interface.

19. The camera system of claim 1, wherein the communication interface element comprises an interface to a display interface.

20. The camera system of claim 1, wherein the communication interface element comprises an interface to an audio interface.

21. The camera system of claim 1, further comprising a power-monitoring block for shutting down all activities on the single-chip camera during a low power state.

22. The camera system of claim 1, further comprising a set of one or more control registers.

23. The camera system of claim 22, further comprising a register control logic element for translating control data to and from the one or more control registers.

24. The camera system of claim 23, further comprising a serial decoder for translating high speed requests from the communication interface element into lower speed requests for the image sensor.

25. The camera system of claim 1, wherein each element of the camera is categorized as analog or digital.

26. The camera system of claim 25, wherein electrical activity is separated between analog elements and digital elements.

27. A method for a single-chip integrated circuit camera, comprising the steps of:
   exposing one or more lines of pixels of a sensor array to light;
   sampling the one or more lines of pixels with an analog-to-digital converter;
   applying a correlated double sampling using a image processing element to the sampled pixels to eliminate point-wise fixed pattern noise;
   adjusting digital gain to preserve color fidelity using said image processing element;
   sending resulting data to an output control element; and
   testing internal functionality of the single-chip integrated circuit camera using a test access element comprising one or more IO pins, wherein the one or more IO pins is either connected to a register set for controlling external functions or connected to internal data inputs and outputs for testing purpose, wherein the connection of the one or more IO pins is controlled by an on-chip multiplexer,
   wherein said image sensor, said analog-to-digital converter, said image processing element, said output control element, said test access element, said register set and said on-chip multiplexer, are on said single chip integrated circuit camera.

28. The method of claim 27, further comprising the step of compressing the data from the output control element.

29. The method of claim 28, wherein the compressing step comprises: compressing the data with a differential coding, compressing the resulting compressed data with Huffman coding, and loading the resulting compressed data into packets.

30. The method of claim 28, wherein the compressing step comprises: compressing the data with JPEG coding and loading the resulting compressed data into packets.

31. The method of claim 28, wherein the compressing step comprises: compressing the data with MPEG coding and loading the resulting compressed data into packets.

32. The method of claim 28, wherein the compressing step comprises: compressing the data with a wavelet coding and loading the resulting compressed data into packets.

33. The method of claim 28, further comprising the step of sending the compressed data via an interface to a host computer wherein said interface is on said single chip integrated circuit camera.

34. The method of claim 33, wherein the interface is an USB interface controller.

35. The method of claim 33, wherein the interface is an IEEE 1394 interface controller.

36. The method of claim 33, wherein the interface is a hardwired LAN interface controller.

37. The method of claim 33, wherein the interface is a Bluetooth wireless interface controller.

38. The method of claim 33, wherein the interface is a wireless LAN interface controller.

* * * * *